UNITED STATES PATENT OFFICE.

CICERO C. FERRILL, OF SHUBUTA, MISSISSIPPI.

DEVICE FOR ATTACHING AND DETACHING HORSES.

SPECIFICATION forming part of Letters Patent No. 297,367, dated April 22, 1884.

Application filed February 4, 1884. (No model.)

*To all whom it may concern:*

Be it known that I, CICERO C. FERRILL, of Shubuta, in the county of Clark and State of Mississippi, have invented a new and useful Improvement in Devices for Attaching and Detaching Horses to and from Vehicles, of which the following is a full, clear, and exact description, reference being had to the annexed drawings, forming part of this specification.

This invention has for its object a horse attacher and detacher which may dispense with ordinary harness except a collar and pair of hames; and the invention consists of the novel construction hereinafter described and claimed.

Figure 1:
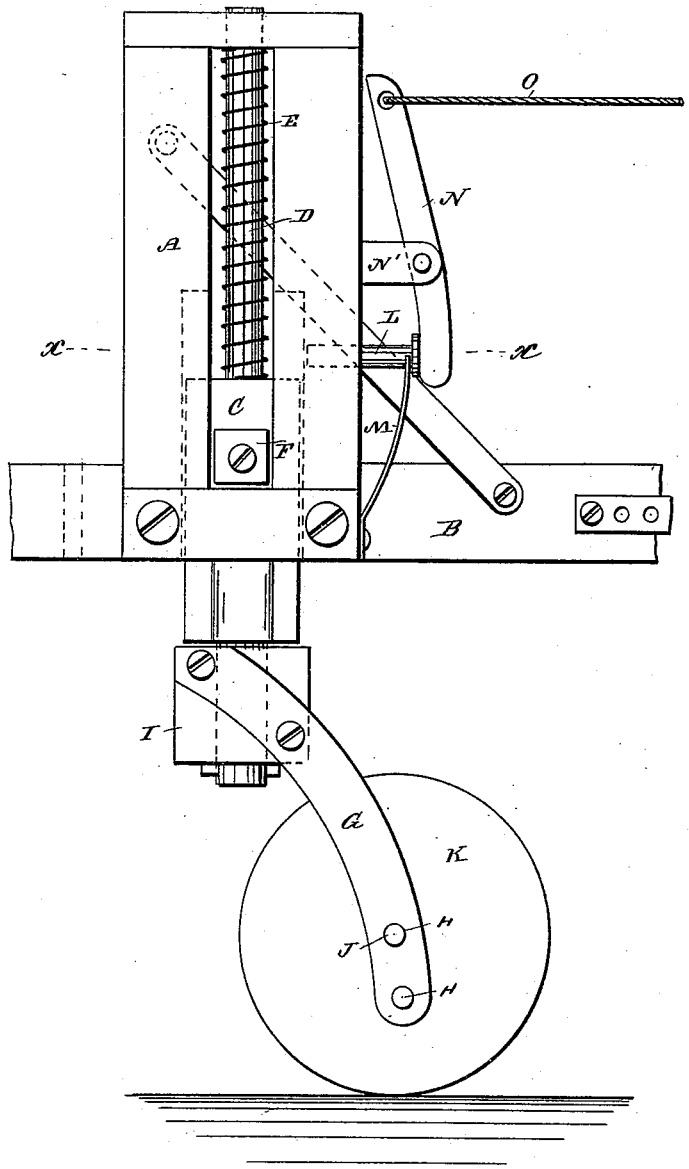
Figure 2:
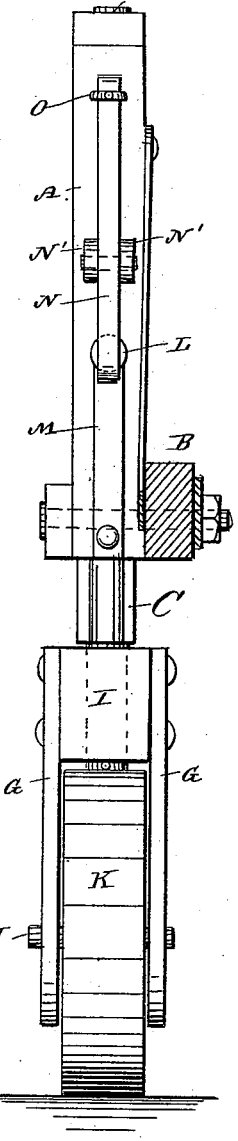
Figure 3:
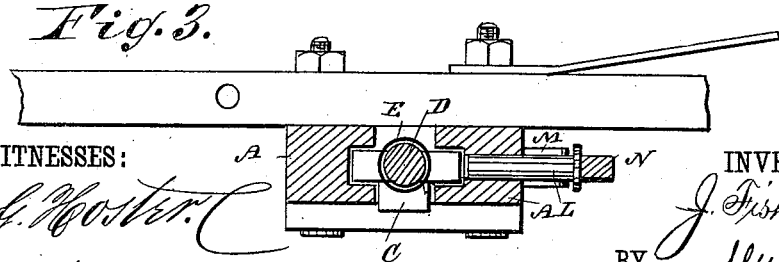

In the drawings, Figure 1 is a plan view of two pairs of thills connected together, to be used on two-horse vehicles. Fig. 2 is a detail view, partly in section, showing the manner of attaching the thills to the hames; and Fig. 3 is a cross-section taken on line $x\,x$ of Fig. 2.

A indicates a pair of thills having the ordinary breeching-strap, B, secured thereto. For two-horse vehicles two pairs of such thills, connected together as shown, are to be used. The outer ends of the thills are provided with ferrules C, each of which is provided with a tubular attachment, C′, parallel therewith, in which is arranged a pin, D, having a retaining spiral spring, E. The rear end of the pin has an eye, F, to which a cord or strap (not shown) may be attached, to enable the driver to draw the pin toward him while seated in the vehicle. The upper part of the tubular attachment C′ is provided with a transverse opening, G, through which a ring or loop, H, attached to the hames I, may be passed, to allow the pin D to engage therewith when properly retracted. To the hames is also secured a guard, J, which may be a curved plate or a hook, under which the tubular attachment C′ fits, and by which the thills are securely held from upward movement at the ends.

K is the collar, on which the hames are fitted and secured in the usual manner.

What I claim is—

1. The ferrule C, having tubular attachment C′, provided with transverse opening G and spring-actuated pin D, substantially as shown and described.

2. The combination of the thills having the ferrules C and spring-actuated pins D, connected therewith, and the hames having the loops H and guards J, substantially as shown and described.

CICERO C. FERRILL.

Witnesses:
   A. G. LYNE,
   SOLON C. KEMON.

(No Model.)

J. FISHER.
TONGUE REST.

No. 297,368. Patented Apr. 22, 1884.

WITNESSES:
Theo. G. Hoster
C. Sedgwick

INVENTOR:
J. Fisher
BY Munn & Co.
ATTORNEYS.

N. PETERS. Photo-Lithographer. Washington, D. C.